(12) United States Patent
Wu et al.

(10) Patent No.: US 11,107,211 B2
(45) Date of Patent: Aug. 31, 2021

(54) MEDICAL IMAGING METHOD AND SYSTEM AND NON-TRANSITORY COMPUTER-READABLE STORAGE MEDIUM

(71) Applicant: GE Precision Healthcare LLC, Wauwatosa, WI (US)

(72) Inventors: Dan Wu, Beijing (CN); Kun Wang, Beijing (CN); Weinan Tang, Beijing (CN); Longqing Wang, Beijing (CN)

(73) Assignee: GE Precision Healthcare LLC, Wauwatosa, WI (US)

( * ) Notice: Subject to any disclaimer, the term of this patent is extended or adjusted under 35 U.S.C. 154(b) by 0 days.

(21) Appl. No.: 15/930,884

(22) Filed: May 13, 2020

(65) Prior Publication Data
US 2020/0380669 A1 Dec. 3, 2020

(30) Foreign Application Priority Data
May 29, 2019 (CN) .......................... 201910456891.4

(51) Int. Cl.
*G06T 7/00* (2017.01)
*G06T 7/80* (2017.01)

(52) U.S. Cl.
CPC .............. *G06T 7/0012* (2013.01); *G06T 7/80* (2017.01); *G06T 2207/10088* (2013.01); *G06T 2207/20081* (2013.01); *G06T 2207/20084* (2013.01); *G06T 2207/20182* (2013.01); *G06T 2207/30004* (2013.01); *G06T 2207/30168* (2013.01)

(58) Field of Classification Search
CPC ..................... G06T 7/0012; G06T 7/80; G06T 2207/30168; G06T 2207/30004; G06T 2207/20084; G06T 2207/20182; G06T 2207/10088; G06T 2207/20081; G06T 7/0002; G06T 11/003; A61B 5/055
See application file for complete search history.

(56) References Cited

U.S. PATENT DOCUMENTS

| | | | |
|---|---|---|---|
| 2018/0232878 A1* | 8/2018 | Braun ........................ | G06T 7/20 |
| 2019/0147588 A1* | 5/2019 | Rowley Grant ........ | G06T 5/002 382/131 |
| 2021/0049743 A1* | 2/2021 | Litwiller ................ | G06N 3/084 |

* cited by examiner

*Primary Examiner* — Kim Y Vu
*Assistant Examiner* — Molly Delaney

(57) ABSTRACT

The present application provides a medical imaging method and system and a non-transitory computer-readable storage medium. The medical imaging method comprises identifying an image quality type of a medical image based on a trained learning network, and generating, based on the identified image quality type, a corresponding control signal for controlling a medical imaging system.

17 Claims, 8 Drawing Sheets

MEDICAL IMAGING METHOD AND SYSTEM AND NON-TRANSITORY COMPUTER-READABLE STORAGE MEDIUM

CROSS-REFERENCE TO RELATED APPLICATIONS

This application claims the benefit of French Patent Application No. 201910456891.4 filed on May 29, 2019, the disclosure of which is herein incorporated by reference in its entirety.

TECHNICAL FIELD

The present invention relates to a medical imaging technology, and more specifically, to a medical imaging method and system and a non-transitory computer-readable storage medium.

BACKGROUND

Magnetic resonance imaging (MRI), as a medical imaging modality, can obtain images of the human body without using X-rays or other ionizing radiation. MRI uses a magnet having a strong magnetic field to generate a static magnetic field B0. When a to-be-imaged part of the human body is positioned in the static magnetic field B0, nuclear spin associated with hydrogen nuclei in human tissue is polarized, so that the tissue of the to-be-imaged part generates a longitudinal magnetization vector at a macroscopic level. After a radio-frequency field B1 intersecting the direction of the static magnetic field B0 is applied, the rotational direction of protons changes so that the tissue of the to-be-imaged part generates a transverse magnetization vector at a macroscopic level. After the radio-frequency field B1 is removed, the transverse magnetization vector decays in a spiral manner until it is restored to zero. A free induction decay signal is generated during decay. The free induction decay signal can be acquired as a magnetic resonance signal, and a tissue image of the to-be-imaged part can be reconstructed based on the acquired signal.

A reconstructed image often has image quality problems (e.g., artifacts) during imaging due to hardware problems such as the apparatus or factors such as human motion. Examples of artifacts include a Nyquist (N/2) artifact caused by different short eddy-currents, an acceleration artifact caused by accelerated acquisition, and a motion artifact caused by voluntary or involuntary motion of the human body during acquisition. These artifacts cause image quality reduction and a possible failure to accurately render the actual state of the lesion, causing difficulties in clinical diagnosis and analysis.

In actual operation, when a medical image has an artifact which affects the doctor's diagnosis, it is necessary for the site operator or the site engineer to judge the type of the artifact based on experience, judge the cause of the artifact according to the type of the artifact, and perform relevant operations. Occasionally, the artifact type however cannot be judged in a timely and accurate manner, which is disadvantageous to clinical diagnosis.

SUMMARY

The present invention provides a medical imaging method and system and a non-transitory computer-readable storage medium.

An exemplary embodiment of the present invention provides a medical imaging method, the method comprising identifying an image quality type of a medical image based on a trained learning network, and generating, based on the identified image quality type, a corresponding control signal for controlling a medical imaging system.

An exemplary embodiment of the present invention further provides a non-transitory computer-readable storage medium, for storing a computer program, wherein when executed by a computer, the computer program causes the computer to execute instructions for the medical imaging method described above.

An exemplary embodiment of the present invention further provides a medical imaging system, the system comprising an identification module and a control module. The identification module is configured to identify, based on a trained learning network, an image quality type of a medical image generated by the medical imaging system, and the control module is configured to generate, based on the identified image quality type, a corresponding control signal for controlling the medical imaging system.

Other features and aspects will become clear through the following detailed description, accompanying drawings, and claims.

BRIEF DESCRIPTION OF THE DRAWINGS

The present invention may be better understood by describing exemplary embodiments of the present invention with reference to accompanying drawings, in which.

DETAILED DESCRIPTION

Figure 1:
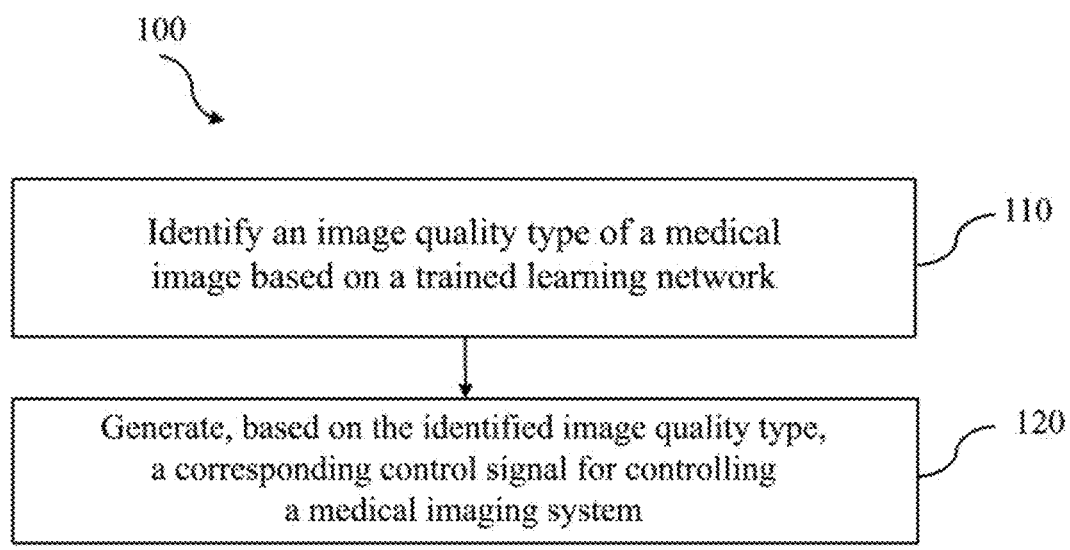
FIG. 1 is a flowchart of a medical imaging method according to some embodiments of the present invention.

Specific implementation manners of the present invention will be described in the following. It should be noted that during the specific description of the implementation manners, it is impossible to describe all features of the actual implementation manners in detail in this description for the sake of brief description. It should be understood that in the actual implementation of any of the implementation manners, as in the process of any engineering project or design project, a variety of specific decisions are often made in order to achieve the developer's specific objectives and meet system-related or business-related restrictions, which will vary from one implementation manner to another. Moreover, it can also be understood that although the efforts made in such development process may be complex and lengthy, for those of ordinary skill in the art related to content disclosed in the present invention, some changes in design, manufacturing, production or the like based on the technical content disclosed in the present disclosure are only conventional technical means, and should not be construed as that the content of the present disclosure is insufficient.

Unless otherwise defined, the technical or scientific terms used in the claims and the description are as they are usually understood by those of ordinary skill in the art to which the present invention pertains. The words "first," "second" and similar words used in the description and claims of the patent application of the present invention do not denote any order, quantity or importance, but are merely intended to distinguish between different constituents. "One," "a" and similar words are not meant to be limiting, but rather denote the presence of at least one. The word "include," "comprise" or a similar word is intended to mean that an element or article that appears before "include" or "comprise" encompasses an element or article and equivalent elements that are listed after "include" or "comprise," and does not exclude other elements or articles. The word "connect," "connected" or a similar word is not limited to a physical or mechanical connection, and is not limited to a direct or indirect connection.

In some embodiments, during imaging, a reconstructed image has different artifacts due to different hardware problems of the apparatus or different factors such as human motion. A medical imaging method and system in some embodiments of the present invention can accurately judge an image quality type (for example, an artifact) in an image based on a deep learning technology, and automatically generate, based on the image quality type, a control signal for controlling a magnetic resonance imaging (MRI) system, for example, for calibrating the MRI system or sending a warning signal. It should be noted that from the perspective of those of ordinary skill in the art or related art, such description should not be construed as limiting the present invention only to an MRI system. In fact, the medical imaging method and system described here may be reasonably applied to other imaging fields in medical fields or non-medical fields, such as CT systems, PET systems, SPECT systems, X-ray machines, or any combination thereof.

As discussed herein, the deep learning technology (also referred to as deep machine learning, hierarchical learning, deep structured learning, or the like) employs an artificial neural network for learning. The deep learning method is characterized by using one or a plurality of network architectures to extract or simulate data of interest. The deep learning method may be implemented using one or a plurality of processing layers (for example, an input layer, an output layer, a convolutional layer, a normalization layer, or a sampling layer, where processing layers of different numbers and functions may exist according to different deep learning network models), where the configuration and number of the layers allow a deep learning network to process complex information extraction and modeling tasks. Specific parameters (or referred to as "weight" or "offset") of the network are usually estimated through a so-called learning process (or training process). The learned or trained parameters usually result in (or output) a network corresponding to layers of different levels, so that extraction or simulation of different aspects of initial data or the output of a previous layer usually may represent the hierarchical structure or concatenation of layers. During image processing or reconstruction, this output may be represented as different layers with respect to different feature levels in the data. Thus, processing may be performed layer by layer. That is, an earlier or higher-level layer may correspond to extraction of "simple" features from input data and then these simple features are combined into a layer exhibiting features of higher complexity. In practice, each layer (or more specifically, each "neuron" in each layer) may process input data as output data representation using one or a plurality of linear and/or non-linear transformations (so-called activation functions). The number of the plurality of "neurons" may be constant between the plurality of layers or may vary from layer to layer.

As discussed herein, as part of initial training of a deep learning process to solve a specific problem, a training data set includes a known input value (for example, a sample image or a pixel matrix of the image subjected to coordinate transformation) and an expected (target) output value (for example, an image or an identification and judgment result) finally outputted in the deep learning process. In this manner, a deep learning algorithm can process the training data set (in a supervised or guided manner or an unsupervised or unguided manner) until a mathematical relationship between a known input and an expected output is identified and/or a mathematical relationship between the input and output of each layer is identified and represented. In the learning process, (part of) input data is usually used, and a network output is created for the input data; afterwards, the created network output is compared with the expected output of the data set; and then a difference between the created and expected outputs is used to iteratively update network parameters (weight and/or offset). A stochastic gradient descent (SGD) method may usually be used to update network parameters. However, those skilled in the art should understand that other methods known in the art may also be used to update network parameters. Similarly, a separate validation data set may be used to validate a trained learning network, where both a known input and an expected output are known. The known input is provided to the trained learning network so that a network output can be obtained, and then the network output is compared with the (known) expected output to validate prior training and/or prevent excessive training.

Figure 2:
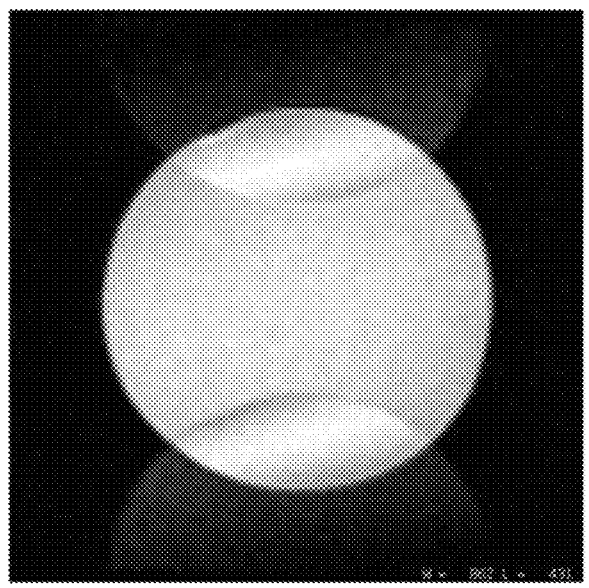
FIG. 2 is a schematic diagram of a medical image including a Nyquist artifact.
Figure 3:
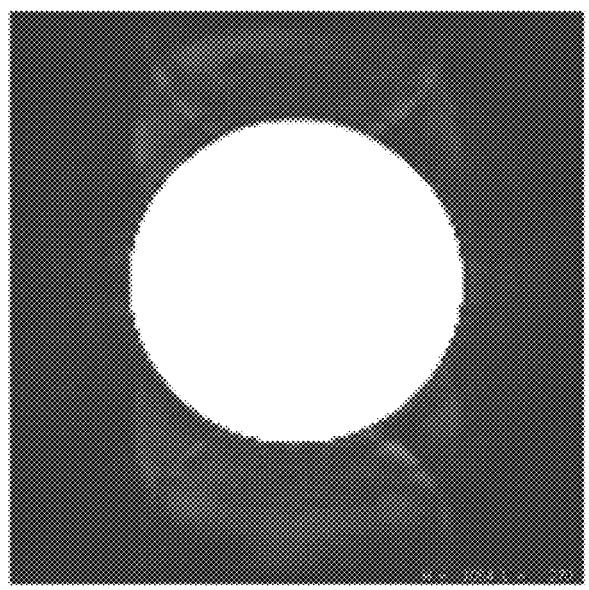
FIG. 3 is a schematic diagram of a medical image including an acceleration artifact.

FIG. 1 is a flowchart of a medical imaging method 100 according to some embodiments of the present invention. FIG. 2 is a schematic diagram of a medical image including a Nyquist artifact. FIG. 3 is a schematic diagram of a medical image including an acceleration artifact. As shown in FIGS. 1 to 3, the medical imaging method 100 in some embodiments of the present invention includes steps 110 and 120.

Step 110: identify an image quality type of a medical image based on a trained learning network.

In some embodiments, the image quality type may include one or a plurality of artifact types, for example, a Nyquist artifact (shown in FIG. 2) caused by different short eddy-currents, an acceleration artifact (shown in FIG. 3) caused by accelerated acquisition, a motion artifact (not shown in the figures) caused by voluntary or involuntary motion of the human body during acquisition, and a truncation artifact (not shown in the figures) caused by data missing or truncation. In some embodiments, the aforementioned image quality problem may further include one or a plurality of non-artifact types, for example, image quality problems caused by the signal-to-noise ratio, resolution, contrast, and the like.

In some embodiments, the identifying an image quality type in a medical image includes analyzing a matching degree of an artifact (or a non-artifact) in the medical image with the at least one artifact type (or at least one non-artifact type). The matching degree includes a label and a probability thereof. The probability is the probability that the artifact in the image to be judged is a specific artifact. For example, a medical image to be judged is inputted to a learning network for identification, and a set label representing each artifact and a probability of an identified artifact are outputted. For example, label 1—Nyquist artifact 95%; label 2—motion artifact 0%; label 3—acceleration artifact 0%; and label 4—truncation artifact 0% are outputted. In some embodiments, the identifying an image quality type of a medical image further includes outputting an artifact type whose matching degree with the medical image is greater than a preset value or is on a preset ranking. For example, only label 1—Nyquist artifact 95% or Nyquist artifact 95% is outputted.

Although the output manners of artifact types are listed above, those skilled in the art should know that artifact types may be outputted in other manners not limited to the above ones. For example, a label code or a specific artifact type or any combination thereof may be outputted.

In addition, although only four artifact types are listed in the above embodiments, those skilled in the art should know that far more than these four artifact types exist in the actual imaging process, and the medical imaging method in the embodiments of the present invention is not limited to identifying the aforementioned four artifacts, data sets corresponding to various image quality types may be inputted in a training stage of a learning network so that different image quality types can be identified through the learning network.

The learning network is completed through preparation of training data, selection and construction of a learning network model, and training, testing, and optimization of the learning network.

In some embodiments, the learning network is obtained by training based on a data set of sample images (a known input) and corresponding image quality types (an expected output) thereof. Specifically, the training of the learning network includes the following step 1 to step 3.

Step 1: obtain a plurality of medical images having image quality problems (for example, quality problems of artifacts and/or non-artifacts) as a sample image set. In some embodiments, the sample images are obtained after preprocessing is performed based on medical images reconstructed by a medical imaging system, where the preprocessing includes normalization or the like. In some other embodiments, unnormalized medical images may also be used as a sample image set and the sample image set is inputted to a learning network, and then the sample images are normalized based on a normalization layer in the learning network. In some embodiments, the sample images are medical images obtained under a plurality of specific imaging conditions of the medical imaging system. The specific imaging conditions may include, for example, one hardware configuration or scanning flow through which a Nyquist artifact is easily obtained, another hardware configuration or scanning flow through which an acceleration artifact is easily obtained, scanning of an imaged part (for example, the heart of the human body) in motion through which a motion artifact is easily obtained, or a combination of a plurality of imaging conditions through which more than two types of artifacts are included.

Step 2: obtain an image quality type (which may be represented in the form of a label) of each image in the sample image set to serve as an image quality type set. In some embodiments, the image quality type may be prejudged based on experience. In some embodiments, the image quality type corresponding to the sample image may be represented in the form of a label. For example, label 1 represents a Nyquist artifact, label 2 represents a motion artifact, label 3 represents an acceleration artifact, label 4 represents a truncation artifact, and so on. Further, label 0 may also be set to represent a non-artifact type or different labels may be specifically set to represent different non-artifact quality types. However, those skilled in the art can understand that the image quality types are not limited to the aforementioned representation manners, and may also employ any suitable manners, and the aforementioned manners of labels and contents represented by the labels all can be changed.

Step 3: train a learning network by using the sample image set as an input and the image quality type set as an output, so as to obtain the trained learning network. In some embodiments, the trained learning network may be updated based on a new sample image set and a corresponding image quality type set thereof, where the image quality type set may be prejudged based on experience or obtained based on the aforementioned trained learning network.

In some embodiments, the learning network is trained based on a ResNet (Residual Network) or a VGGNet (Visual Geometry Group Network) or other well-known models. Since the number of processing layers in the ResNet can be set large (as large as 1000 or more), classification (for example, judgment of an artifact type) based on this network structure can achieve a better effect. Furthermore, it is easier for the ResNet to optimize the learning network based on more training data.

Figure 4:
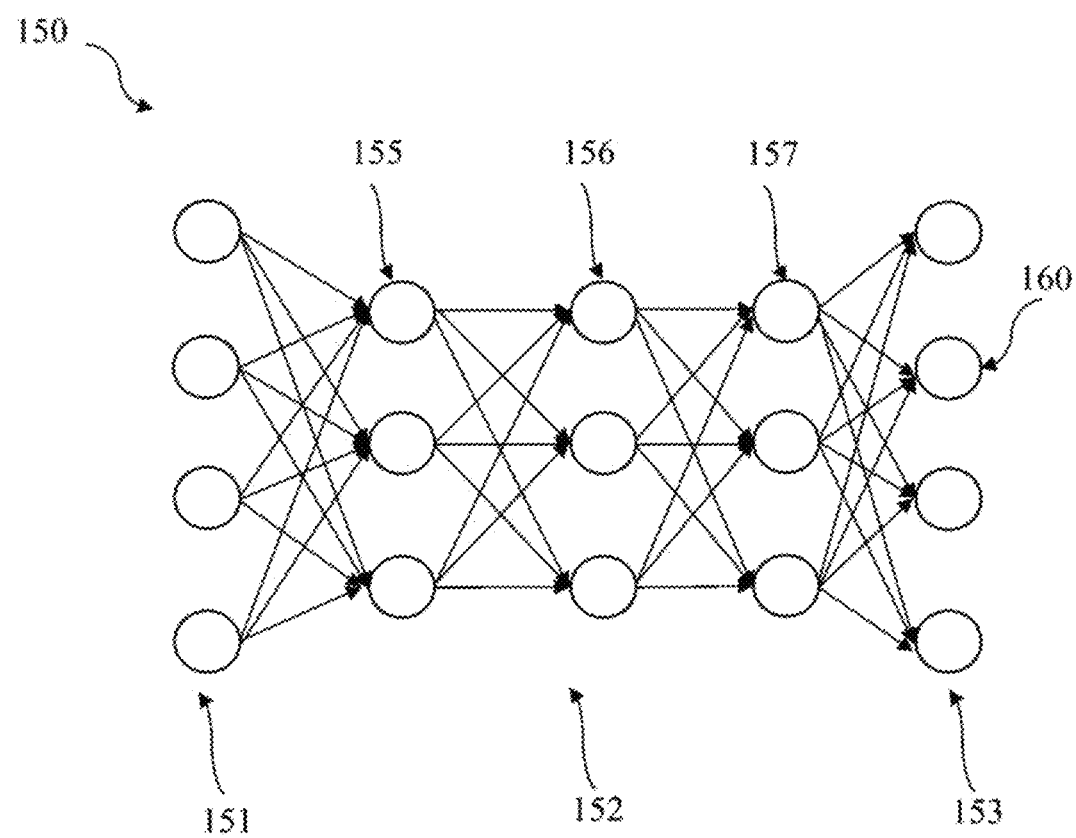
FIG. 4 is a schematic diagram of a learning network according to some embodiments of the present invention.

FIG. 4 illustrates a learning network 150 according to some embodiments of the present invention. As shown in FIG. 4, the learning network 150 includes an input layer 151, processing layers (or referred to as hidden layers) 152, and an output layer 153. In some embodiments, as shown in FIG. 4, the processing layers 152 include a first convolutional layer 155, a first pooling layer 156, and a fully-connected layer 157. The first convolutional layer 155 is configured to convolve an input image (or pixels) to obtain a feature map of the first convolutional layer. The first pooling layer 156 pools (downsamples) the feature map of the first convolutional layer to compress the feature map of the first convolutional layer and extract main features thereof, so as to obtain a feature map of the first pooling layer. The fully-connected layer 157 may output a judgment result based on the feature map of the first pooling layer.

Although FIG. 4 shows the example of only one convolutional layer, in other examples, the convolutional layers may be of any number, and the number of the convolutional layers may be appropriately adjusted according to the size of input data (for example, the number of pixels in the image) in the learning network. For example, a second convolutional layer and a second pooling layer (not shown in the figure) are further included between the first pooling layer 156 and the fully-connected layer 157, or a second convolutional layer and a second pooling layer, a third convolutional layer and a third pooling layer (not shown in the figure), and so on are further included between the first pooling layer 156 and the fully-connected layer 157.

Although FIG. 4 only shows that the convolutional layer is connected to the input layer, the pooling layer is connected to the convolutional layer, and the fully-connected layer is connected to the pooling layer, in other examples, any number of processing layers of any type may be provided between any two of the aforementioned layers. For example, a normalization layer is provided between the convolutional layer and the input layer to normalize the input image (or pixels), or an activation layer is provided between the fully-connected layer and the pooling layer to perform nonlinear mapping on the feature map of the pooling layer using a rectified linear unit (ReLU) activation function.

In some embodiments, each layer includes several neurons 160, and the number of neurons in each layer may be the same or set differently according to needs. A sample data set (a known input) and an image quality type set (an expected output) are inputted to a learning network, the number of processing layers in the learning network and the number of neurons in each processing layer are set, and a weight and/or offset of the learning network is estimated (or adjusted or calibrated), so as to identify a mathematical relationship between the known input and the expected output and/or identify and represent a mathematical relationship between the input and output of each layer. In the learning process, (part of) input data is usually used, and a network output is created for the input data; afterwards, the created network output corresponding to the known input is compared with the expected output of the data set, a difference thereof is a loss function; and the loss function is used to iteratively update network parameters (weight and/or offset) to continuously decrease the loss function, so as to train a neural network model with higher accuracy. In some embodiments, many functions can be used as the loss function, including, but not limited to, mean squared error (mean sugared), cross entropy error, and the like. When the learning network is created or trained, it only needs to input a medical image to be judged to the learning network, so that an image quality type of the image, or information such as a label and a matching degree related to the image quality type can be obtained.

In one embodiment, although the configuration of the learning network 150 is guided by dimensions such as priori knowledge, input, and output of an estimation problem, the learning itself is regarded as a "black box," and implements optimal approximation of required output data mainly depending on or exclusively according to input data. In various alternative implementations, clear meaning may be assigned to some data representations in the learning network 150 using some aspects and/or features of data, an imaging geometry, a reconstruction algorithm, or the like. This helps to accelerate training and creates an opportunity to separately train (or pre-train) or define some layers in the learning network 150.

Still referring to FIG. 1, step 120: generate, based on the identified image quality type, a corresponding control signal for controlling a medical imaging system.

Figure 5:
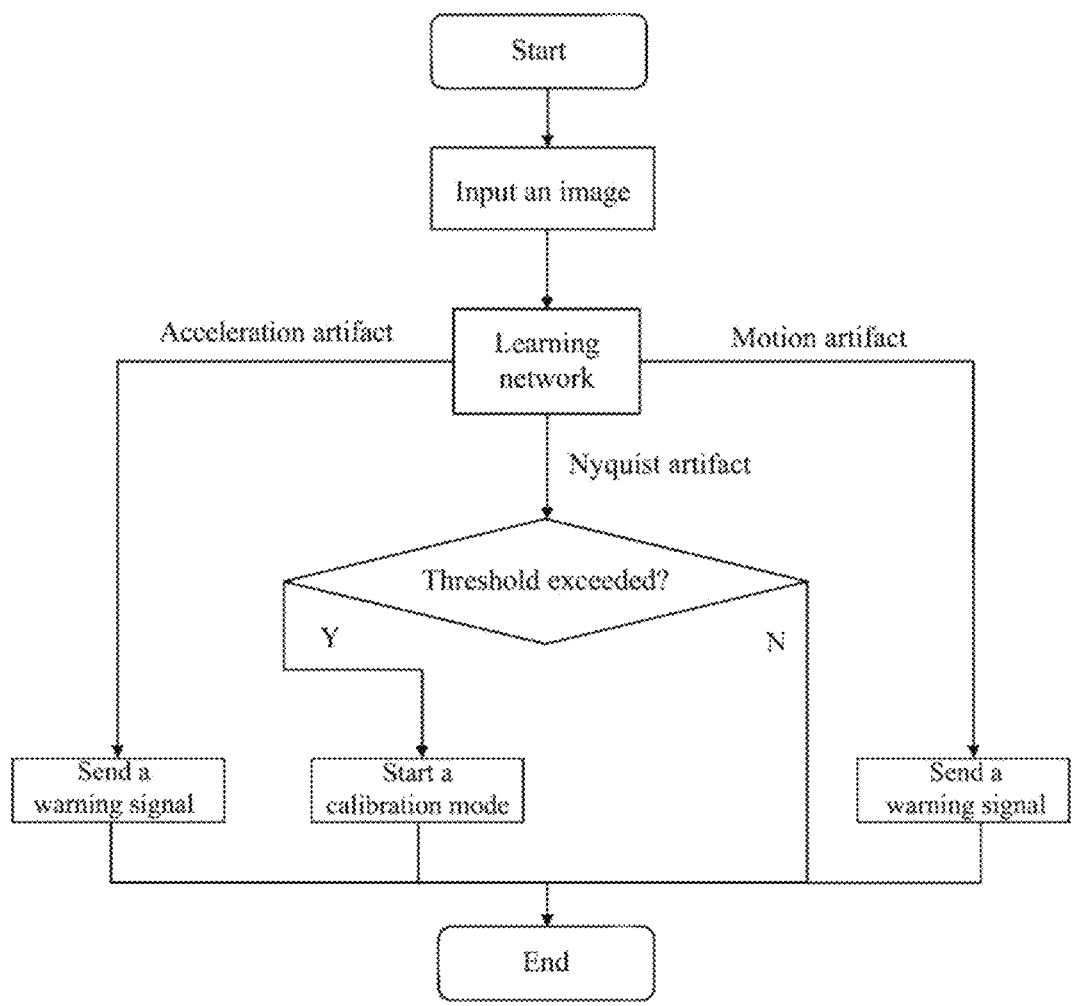
FIG. 5 is a flowchart of generating, based on an identified image quality type, a corresponding control signal for controlling a medical imaging system in the medical imaging method shown in FIG. 1.

FIG. 5 is a schematic flowchart of generating, based on an identified image quality type, a corresponding control signal for controlling a medical imaging system (step 120) in the medical imaging method according to some embodiments of the present invention. As shown in FIG. 5, a medical image to be judged is inputted to the learning network so that an artifact type of the medical image can be obtained.

When the medical image is identified as an acceleration artifact in a magnetic resonance image, a first control signal is generated to control the medical imaging system to send a warning signal for adjusting an acceleration factor. When the medical image is identified as a motion artifact in a magnetic resonance image, a second control signal is generated to control the medical imaging system to send a warning signal about motion of a detected object.

In some embodiments, the warning signal may be displayed by a display unit (for example, a display unit 260 in an MRI system shown in FIG. 6) of the medical imaging system, where a graphical user interface of the display unit may display a warning sign, for example, a warning sign represented by colors, symbols, or the like. The graphical user interface of the display unit may display, for example, an artifact type, and a corresponding correction method or adjustment of some scanning coefficients in the medical imaging system or other relevant information. In some other embodiments, the warning signal may be sent by a warning device of the medical imaging system, where the warning device may be, for example, a horn, a siren, or any other known type of warning device.

When the medical image is identified as a Nyquist artifact in a magnetic resonance image, a third control signal is generated to control the medical imaging system to start a calibration mode. In some embodiments, when the medical image is identified as a Nyquist artifact, threshold comparison is further performed on a matching degree (for example, a probability) outputted by the learning network, and if the matching degree is higher than a preset threshold (for example, 80%), a third control signal is generated to control the medical imaging system to (stop scanning and) start a calibration mode. In some embodiments, the calibration mode includes adjustment or compensation of a gradient system, or the like. Those skilled in the art should understand that the above description is not limited to threshold comparison with a matching degree for a Nyquist artifact, and the same or similar comparison may also be performed for other artifact types or image quality types. Furthermore, those skilled in the art should understand that the embodiments of the present invention are not limited to automatic start of the calibration mode when a Nyquist artifact is identified; it may also be set that when a Nyquist artifact is identified, the medical imaging system performs human-computer interaction based on an alarm, an inquiry, or other forms of signals, and enables or starts a calibration mode based on an interaction result.

In some embodiments, the control signal may be set to perform different functions based on different artifact types, which are not limited to the two functions mentioned above, and may be any other function, for example, self-test of the medical imaging system or historical data analysis of an imaged image.

In some embodiments, before step 110 (identifying an image quality type in a medical image based on a trained learning network), the method further includes receiving, based on an instruction of a user, the medical image generated by the medical imaging system. The instruction of the user may be inputted through an operating console unit (for example, an operating console unit 250 in the MRI system shown in FIG. 6) of the medical imaging system. Further, the user instruction sent by the operator console unit may be received through a controller unit (or other control devices or computers). In some embodiments, the instruction of the user may also be inputted through a button or a key in the display unit (for example, the operating console unit 260 in the MRI system shown in FIG. 6) of the medical imaging system. Further, the user instruction sent by the display unit may be received through the controller unit (or other control devices or computers). For example, the user may select to perform the aforementioned steps 110 and 120 on the image based on a prejudgment of the medical image (for example, the image affects diagnosis). At this time, the image is sent to a module configured to identify an image quality type through an operating instruction of the user before step 110 is performed.

In some embodiments, a learning network may be trained through a sample image set of different types of artifacts and a corresponding artifact type set thereof. The learning network not only has low requirements for the number of training data sets, but also can accurately identify the type of an artifact in a medical image obtained by the medical imaging system. However, the learning network also has some problems. For example, if a medical image wrongly identified (having an image quality problem caused by other reasons, for example, by the signal-to-noise ratio, contrast, resolution, or the like) to have an artifact is inputted to the learning network, misjudgments still exist even if the learning network outputs a low matching degree. Therefore, further, in the training and/or update stage of the learning network, some images not having artifacts but having other quality problems may also be inputted, and corresponding image quality types thereof may be set as, for example, label 0—no artifact. Through the setting, when the user finds that the medical image quality is undesirable and thinks that an artifact exists, the medical imaging method provided in the embodiments of the present invention is started. A control signal "Non-artifact or No artifact" can be outputted through the identification of the learning network, so as to control the medical imaging system to send a warning signal (or a label, for example) to the doctor or to start a corresponding calibration mode. On one hand, it is convenient for the doctor to investigate other causes of image quality reduction or alleviate such image quality problems, and on the other hand, mis-start or mis-operation performed by the doctor can be better coped with.

Furthermore, in the training and/or update stage of the learning network, sample images including different non-artifact types are inputted, and corresponding image quality types thereof may be set as different labels, for example, label 11—signal-to-noise ratio problem, label 12—contrast problem, and label 13—resolution problem. Through the aforementioned setting, when the user finds that the medical image quality is undesirable, no prejudgment is needed, and the medical imaging method provided in the embodiments of the present invention can be started to identify the image quality problem. Furthermore, a corresponding control signal can be outputted through the identification of the learning network, so as to control the medical imaging system to send a warning signal (or a label, for example) to the doctor or to start a corresponding different calibration mode (for example, adjusting a scanning time or scanning parameter).

The medical imaging method based on deep learning provided in the present invention can judge, in a more accurate and timely manner, image quality types such as different artifacts in medical images without relying on the experience-based judgment of the site engineer. Furthermore, a control signal for controlling the medical imaging system can be generated based on the judged image quality type so as to help the user learn about the objective cause of the image quality problem in time, and the medical imaging system can be further adjusted or calibrated to better solve the image quality problem.

Figure 6:
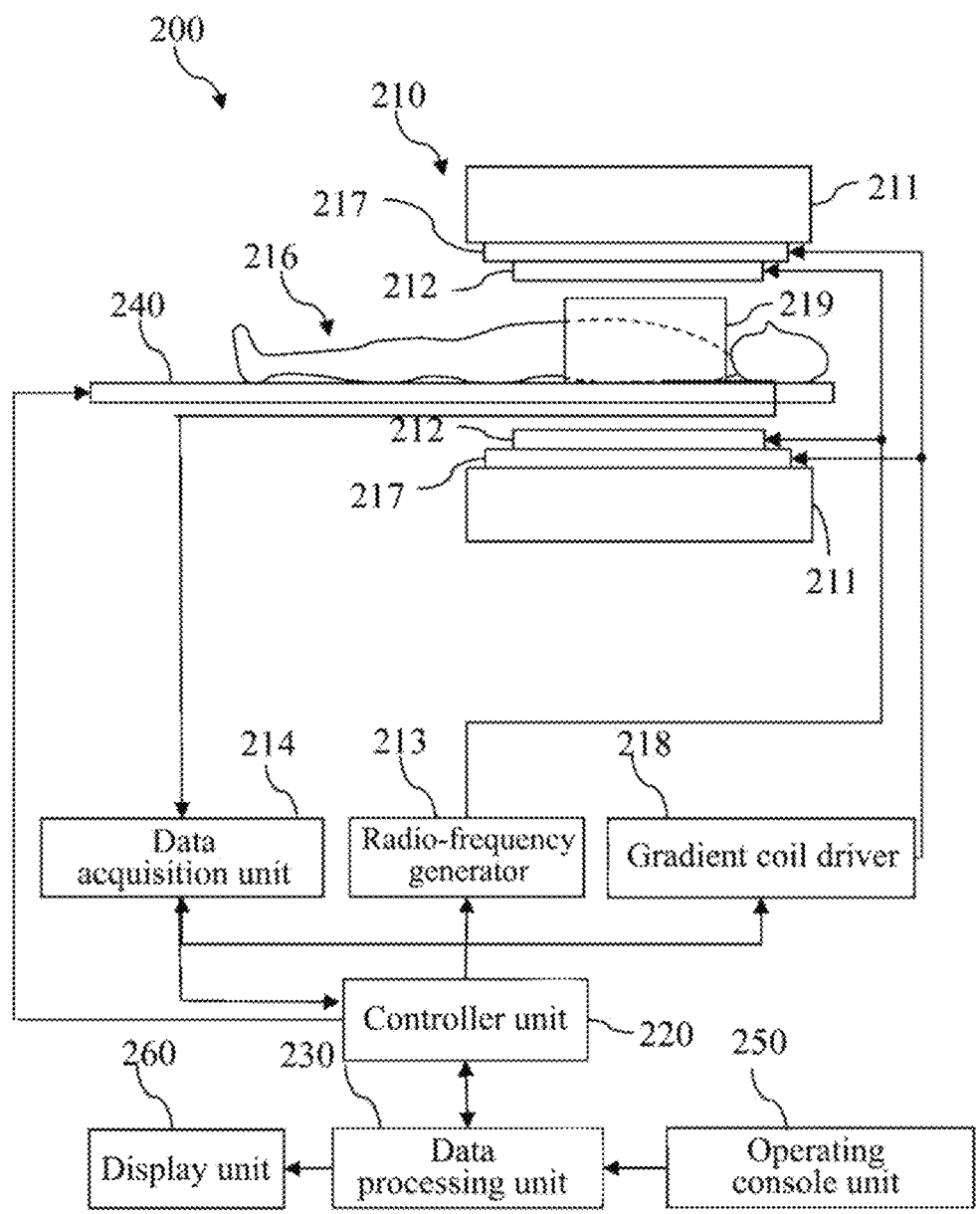
FIG. 6 is a schematic diagram of a magnetic resonance imaging system according to some embodiments of the present invention.

FIG. 6 is a schematic diagram of an MRI system 200 according to some embodiments of the present invention. As shown in FIG. 6, the MRI system 200 includes a scanner 210, a controller unit 220, and a data processing unit 230. The MRI system 200 is described only as an example. In other embodiments, the MRI system 200 may have many transformations as long as image data can be acquired from a detected object.

The scanner 210 may be configured to obtain data of a detected object 216. The controller unit 220 is coupled to the scanner 210 and configured to control the operation of the scanner 210. The scanner 210 may include a main magnet 211, a radio-frequency transmit coil 212, a radio-frequency generator 213, a gradient coil system 217, a gradient coil driver 218, and a radio-frequency receive coil 219.

The main magnet 211 usually includes, for example, an annular superconducting magnet, where the annular superconducting magnet is mounted in an annular vacuum container. The annular superconducting magnet defines a cylindrical space surrounding the detected object 216. Moreover, a constant static magnetic field, such as a static magnetic field B0, is generated along a Z direction of the cylindrical space. The MRI system 200 uses the formed static magnetic field B0 to emit a magnetostatic pulse signal to the detected object 216 placed in the imaging space, so that the precession of protons in the body of the detected object 216 is ordered to generate a longitudinal magnetization vector.

The radio-frequency generator 213 is configured to generate a radio-frequency pulse. The radio-frequency pulse may include a radio-frequency excitation pulse. The radio-frequency excitation pulse is amplified by (for example, a radio-frequency power amplifier (not shown)) and then applied to the radio-frequency transmit coil 212, so that the radio-frequency transmit coil 212 emits to the detected object 216 a radio-frequency magnetic field B1 orthogonal to the static magnetic field B0 to excite nuclei in the body of the detected object 216, and the longitudinal magnetization vector is converted into a transverse magnetization vector. After the end of the radio-frequency excitation pulse, a free induction decay signal, namely, a magnetic resonance signal that can be acquired, is generated in the process that the transverse magnetization vector of the detected object 216 is gradually restored to zero.

The radio-frequency transmit coil 212 may be a body coil that may be connected to a transmit/receive (T/R) switch (not shown). The transmit/receive (T/R) switch is controlled so that the body coil can be switched between a transmit mode and a receive mode. In the receive mode, the body coil may be configured to receive the magnetic resonance signal from the detected object 216.

The gradient coil system 217 forms a gradient magnetic field in the imaging space so as to provide three-dimensional position information to the magnetic resonance signal. The magnetic resonance signal may be received by the radio-frequency receive coil 219 or the body coil in the receive mode. The data processing unit 230 may process the received magnetic resonance signal to obtain the required image or image data.

Specifically, the gradient coil system 217 may include three gradient coils. Each of the three gradient coils generates a gradient magnetic field that is inclined to one of three spatial axes (for example, X-axis, Y-axis, and Z-axis) perpendicular to each other, and generates a gradient field according to imaging conditions in each of a slice selection direction, a phase encoding direction, and a frequency encoding direction. More specifically, the gradient coil system 217 applies a gradient field in the slice selection direction of the detected object 216 so as to select a slice; and the radio-frequency transmit coil 212 emits the radio-frequency excitation pulse to the slice selected by the detected object 216 and excites the slice. The gradient coil system 217 also applies a gradient field in the phase encoding direction of the detected object 216 so as to perform phase encoding on a magnetic resonance signal of the excited slice. The gradient coil system 217 then applies a gradient field in the frequency encoding direction of the detected object 216 so as to perform frequency encoding on the magnetic resonance signal of the excited slice.

The gradient coil driver 218 is configured to provide a suitable power signal to each of the aforementioned three gradient coils in response to the sequence control signal sent by the controller unit 230.

The scanner 210 may further include a data acquisition unit 214. The data acquisition unit is configured to acquire a magnetic resonance signal received by the radio-frequency surface coil 219 or the body coil. The data acquisition unit 214 may include, for example, a radio-frequency preamplifier (not shown), a phase detector (not shown), and an analog/digital converter (not shown), where the radio-frequency preamplifier is configured to amplify the magnetic resonance signal received by the radio-frequency surface coil 219 or the body coil, the phase detector is configured to perform phase detection on the amplified magnetic resonance signal, and the analog/digital converter is configured to convert the phase-detected magnetic resonance signal from an analog signal to a digital signal. The digitized magnetic resonance signal may be processed, such as calculated or reconstructed, by the data processing unit 230, so as to obtain a medical image, for example, a medical image whose image quality type needs to be identified that is described in the embodiments of the present invention.

The data processing unit 230 may include a computer and a storage medium, where a program of predetermined data processing to be executed by the computer is recorded on the storage medium. The data processing unit 230 may be connected to the controller unit 220 and perform data processing based on the control signal received from the controller unit 220. The data processing unit 230 may also be connected to the data acquisition unit 214 to receive the magnetic resonance signal outputted by the data acquisition unit 214 so as to perform the data processing described above.

The controller unit 220 may include a computer and a storage medium, where the storage medium is configured to store a program executable by the computer, and when the computer executes the program, a plurality of components of the scanner 210 are enabled to implement operations corresponding to the aforementioned imaging sequence. The data processing unit 230 is also enabled to perform predetermined data processing. When the computer executes the program, the medical imaging method described above may further be performed to identify an image quality type of a medical image and output a control signal for controlling any component or module of the MRI system 200. For example, the control signal may be used to perform proper calibration on the MRI system 200 based on the identified image quality type. For example, gradient-related parameters may be adjusted for one image quality problem, and radio frequency-related parameters may be adjusted for another image quality problem.

The storage media of the controller unit 220 and the data processing unit 230 may include, for example, a ROM, a floppy disk, a hard disk, an optical disk, a magneto-optical disk, a CD-ROM, or a non-volatile memory card.

The controller unit 220 may be configured and/or arranged for use in different manners. For example, in some implementations, a single controller unit 220 may be used; in other implementations, a plurality of controller units 220 are configured to work together (for example, based on distributed processing configuration) or separately, where each controller unit 220 is configured to handle specific aspects and/or functions, and/or process data for generating models used only for a specific medical imaging system 200.

In some implementations, the controller unit 220 may be local (for example, in the same place as one or a plurality of medical imaging systems 200, for example, in the same facility and/or the same local network); in other implementations, the controller unit 220 may be remote and thus can only be accessed via a remote connection (for example, via the Internet or other available remote access technologies). In a specific implementation, the controller unit 220 may be configured in a manner similar to that of a cloud, and may be accessed and/or used in a manner substantially similar to that of accessing and using other cloud-based systems.

The MRI system 200 further includes a worktable 240 for placing the detected object 216 thereon. The detected object 216 may be moved into or out of the imaging space by moving the worktable 240 based on the control signal from the controller unit 220.

The MRI system 200 further includes an operating console unit 250 connected to the controller unit 220. The operating console unit 250 may send an obtained operating signal to the controller unit 220, so as to control the working state of the aforementioned components such as the worktable 240 and the scanner 210. The operating signal may include, for example, a scanning protocol or a parameter that is selected manually or automatically, where the scanning protocol may include the aforementioned imaging sequence. Furthermore, the operating console unit 250 may send the obtained operating signal to the controller unit 220, so as to control the data processing unit 230 to obtain an expected image.

The operating console unit 250 may include a user input apparatus, such as a keyboard, a mouse, a voice activation controller, or any other suitable input apparatus in the form of an operator interface, where an operator may input an operating signal/control signal to the controller unit 220 through the user input apparatus.

The MRI system 200 may further include a display unit 260 that may be connected to the operating console unit 250 to display an operation interface and may further be connected to the data processing unit 230 to display the image. An identified image quality type and a corresponding warning signal may further be displayed by the display unit 260.

In some embodiments, the system 200 may be connected to one or a plurality of display units, cloud networks, printers, workstations and/or similar devices located locally or remotely via one or a plurality of configurable wired and/or wireless networks, such as the Internet and/or a virtual private network.

Figure 7:
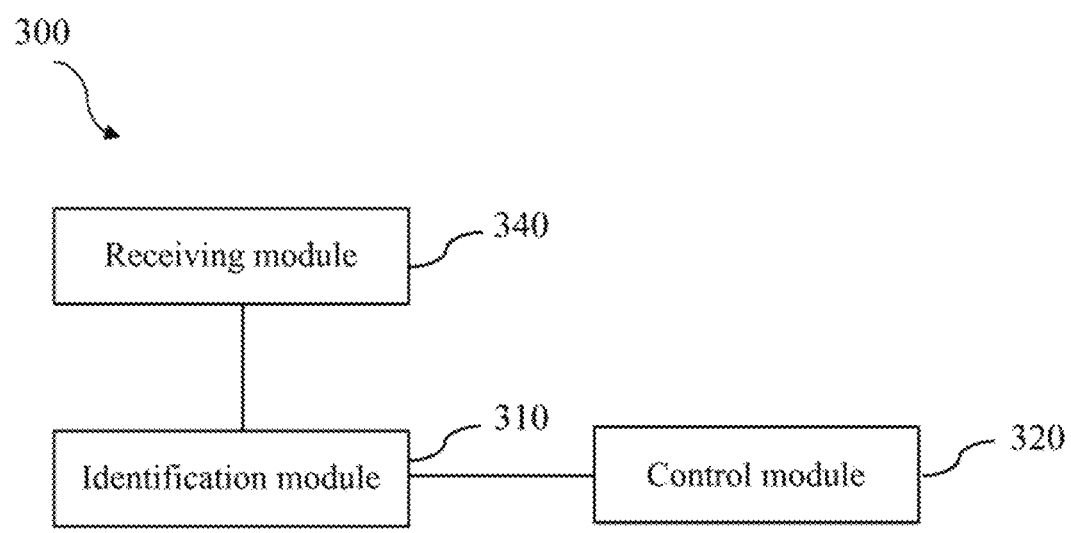
FIG. 7 is a schematic diagram of a medical imaging system according to some embodiments of the present invention.

FIG. 7 is a schematic diagram of a medical imaging system 300 according to some embodiments of the present invention. As shown in FIG. 7, the medical imaging system 300 includes an identification module 310 and a control module 320.

The identification module 310 is configured to identify, based on a trained learning network, an image quality type of a medical image that is generated by the medical imaging system. In some embodiments, the identification module 310 is connected to the controller unit 220 disposed in the MRI system 200 shown in FIG. 6 or serves as part of the controller unit 220.

In some embodiments, the aforementioned image quality types may include one or a plurality of artifact types, for example, a Nyquist artifact, an acceleration artifact, and a motion artifact. In some embodiments, the aforementioned image quality problem may further include one or a plurality of non-artifact types, for example, image quality problems caused by the signal-to-noise ratio, resolution, contrast, and the like. In some embodiments, the identification module 310 may output an artifact (or a non-artifact) in the medical image and a matching degree of the artifact (or non-artifact) with the at least one artifact type (or non-artifact type). In some embodiments, the matching degree includes a label and a probability thereof. For example, when a medical image to be judged for an artifact type is inputted to the learning network, the learning network can output the artifact type in the image to be judged, and a set label representing each artifact and a probability of an identified artifact are outputted. In some embodiments, the identification module 310 is further configured to output an artifact type whose matching degree with the medical image is greater than a preset value or is on a preset ranking.

The aforementioned trained learning network is obtained based on training by a training system on an external carrier (for example, an apparatus other than the medical imaging system). In some embodiments, the training system trains the learning network based on a data set of sample images and corresponding image quality types thereof and based on a ResNet or a VGGNet or other well-known models. In some embodiments, the training system may include a first module configured to store a training data set, a second module configured to perform training and/or update based on a model, and a network configured to connect the first module and the second module. In some embodiments, the first module includes a first processing unit and a first storage unit, where the first storage unit is configured to store a training data set, and the first processing unit is configured to receive a relevant instruction (for example, obtaining a training data set) and send the training data set according to the instruction. Furthermore, the second module includes a second processing unit and a second storage unit, where the second storage unit is configured to store a training model, and the second processing unit is configured to receive a relevant instruction and perform training and/or update of the learning network. In some other embodiments, the training data set may further be stored in the second storage unit of the second module, and the training system may not include the first module. In some embodiments, the network may include various connection types, such as wired or wireless communication links, or fiber-optic cables.

Once data (for example, a trained learning network) is generated and/or configured, the data can be replicated and/or loaded into the MRI system 200, which may be accomplished in a different manner. For example, models may be loaded via a directional connection or link between the MRI system 200 and the controller unit 220. In this regard, communication between different elements may be accomplished using an available wired and/or wireless connection and/or based on any suitable communication (and/or network) standard or protocol. Alternatively or additionally, the data may be indirectly loaded into the MRI system 200. For example, the data may be stored in a suitable machine-readable medium (for example, a flash memory card), and then the medium is used to load the data into the MRI system 200 (for example, by a user or an authorized person of the system on site); or the data may be downloaded to an electronic apparatus (for example, a notebook computer) capable of local communication, and then the apparatus is used on site (for example, by the user or the authorized person of the system) to upload the data to the MRI system 200 via a direct connection (for example, a USB connector).

The control module 320 is configured to generate, based on the identified image quality type, a corresponding control signal for controlling the medical imaging system. In some embodiments, the control module 320 is connected to the controller unit 220 in the MRI system 200 shown in FIG. 6 or serves as part of the controller unit 220, so as to control, based on the image quality type, the medical imaging system to send a warning signal or perform calibration.

The image quality type includes one or a plurality of artifact types. In some embodiments, the control module 320 includes a first control unit (not shown in the figure). The first control unit is configured to generate a first control signal based on an acceleration artifact type in a magnetic resonance image that is outputted by the identification module, so as to control the medical imaging system to send a warning signal for adjusting an acceleration factor.

The control module 320 includes a second control unit (not shown in the figure). The second control unit is configured to generate a second control signal based on a motion artifact in a magnetic resonance image that is outputted by the identification module, so as to control the medical imaging system to send a warning signal about motion of a detected object.

In some embodiments, the warning signal may be displayed by a display unit (for example, the display unit 260 in the MRI system shown in FIG. 6) of the medical imaging system, or sent by the warning device of the medical imaging system.

The control module 320 includes a third control unit (not shown in the figure). The third control unit is configured to generate a third control signal based on a Nyquist artifact in a magnetic resonance image that is outputted by the identification module, so as to control the medical imaging system to start a calibration mode.

In some embodiments, the control module further includes a matching degree comparison unit that is connected to the third control unit and configured to compare the matching degree outputted by the identification module 310 with a preset threshold. The third control unit generates the third control signal based on the Nyquist artifact outputted by the identification module 310 and a result of the comparison. Specifically, when the matching degree outputted by the identification module exceeds the preset threshold, the third control unit generates the third control signal.

In some embodiments, the medical imaging system 300 further includes a receiving module 340 configured to receive, based on an instruction of a user, the medical image generated by the medical imaging system. Further, the receiving module 340 is connected to the operator console unit 250 in the MRI system 200 shown in FIG. 6 to receive a command of the user. Optionally, the receiving module 340 is connected to the controller unit 220 (shown in FIG. 6) to receive, through the controller unit 220, a command sent by the user through the operator console unit 250.

Figure 8:
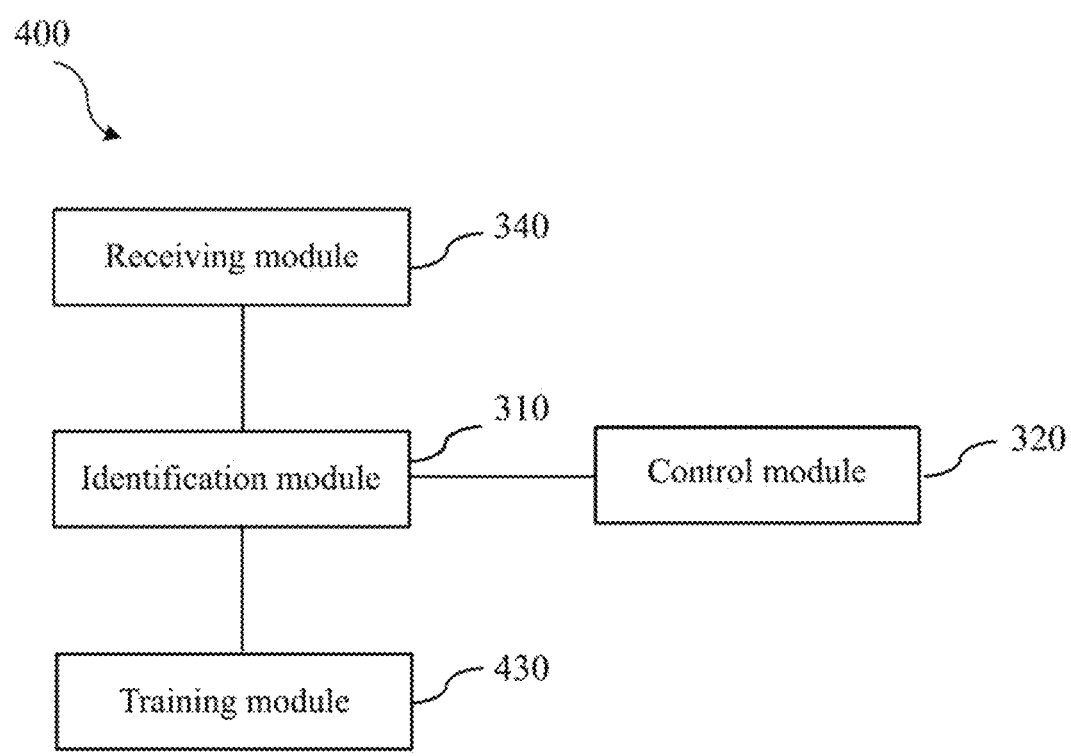
FIG. 8 is a schematic diagram of a medical imaging system according to some other embodiments of the present invention.

FIG. 8 is a schematic diagram of a medical imaging system 400 according to some other embodiments of the present invention. As shown in FIG. 8, unlike the medical imaging system 300 in some embodiments shown in FIG. 7, the medical imaging system 400 further includes a training module 430. The training module 430 trains the learning network based on a data set of sample images and corresponding image quality types thereof and based on a ResNet or a VGGNet or other well-known models. In some embodiments, a training data set is stored in the storage medium of the controller unit 220 of the MRI system 200, and the training module 430 may train and/or update the learning network by obtaining the training data set.

The present invention may further provide a non-transitory computer-readable storage medium, for storing an instruction set and/or a computer program. When executed by a computer, the instruction set and/or computer program causes the computer to perform the aforementioned method for obtaining a predicted image of a truncated portion. The computer executing the instruction set and/or computer program may be a computer of an MRI system, or may be other devices/modules of the MRI system. In one embodiment, the instruction set and/or computer program may be programmed into a processor/controller of the computer.

Specifically, when executed by the computer, the instruction set and/or computer program causes the computer to:

identify an image quality type of a medical image based on a trained learning network; and generate, based on the identified image quality type, a corresponding control signal for controlling a medical imaging system.

The instructions described above may be combined into one instruction for execution, and any of the instructions may also be split into a plurality of instructions for execution. Moreover, the instructions are not limited to the instruction execution order described above.

In some embodiments, before identifying an image quality type in a medical image, the method further includes receiving, based on an instruction of a user, the medical image generated by the medical imaging system.

As used herein, the term "computer" may include any processor-based or microprocessor-based system including a system that uses a microcontroller, a reduced instruction set computer (RISC), an application specific integrated circuit (ASIC), a logic circuit, and any other circuit or processor capable of executing the functions described herein. The above examples are merely exemplary and thus are not intended to limit the definition and/or meaning of the term "computer" in any way.

The instruction set may include various commands that instruct a computer acting as a processor or a processor to perform particular operations, such as the methods and processes of various embodiments. The instruction set may be in the form of a software program, and the software program can form part of one or a plurality of tangible, non-transitory computer-readable media. The software may be in various forms such as system software or application software. In addition, the software may be in the form of a set of independent programs or modules, a program module within a larger program, or part of a program module. The software may also include modular programming in the form of object-oriented programming. The input data may be processed by the processor in response to an operator command, or in response to a previous processing result, or in response to a request made by another processor.

Some exemplary embodiments have been described above; however, it should be understood that various modifications may be made. For example, if the described techniques are performed in a different order and/or if the components of the described system, architecture, apparatus, or circuit are combined in other manners and/or replaced or supplemented with additional components or equivalents thereof, a suitable result can be achieved. Accordingly, other implementation manners also fall within the protection scope of the claims.

The invention claimed is:

1. A medical imaging method, comprising:
   identifying an image quality type of a medical image based on a trained learning network;
   generating, based on the identified image quality type, a corresponding control signal for controlling a medical imaging system;
   wherein the image quality type comprises one or a plurality of artifact types; and
   wherein when the medical image is identified as an acceleration artifact in a magnetic resonance image, a first control signal is generated to control the medical imaging system to send a warning signal for adjusting an acceleration factor.

2. The method according to claim 1, wherein before the identifying an image quality type of a medical image, the method further comprises receiving, based on an instruction of a user, the medical image generated by the medical imaging system.

3. The method according to claim 1, wherein the learning network is obtained by training based on a data set of sample images and corresponding image quality types thereof.

4. The method according to claim 1, wherein the image quality type comprises one or a plurality of non-artifact types.

5. The method according to claim 1, wherein the identifying an image quality type of a medical image comprises analyzing a matching degree of an artifact in the medical image with the one or plurality of artifact types.

6. The method according to claim 5, wherein the identifying an image quality type of a medical image further comprises outputting an artifact type whose matching degree with the medical image is greater than a preset value or is on a preset ranking.

7. The method according to claim 1, wherein when the medical image is identified as a motion artifact in a magnetic resonance image, a second control signal is generated to control the medical imaging system to send a warning signal about motion of a detected object.

8. The method according to claim 1, wherein when the medical image is identified as a Nyquist artifact in a magnetic resonance image, a third control signal is generated to control the medical imaging system to start a calibration mode.

9. The method according to claim 5, wherein when the medical image is identified as a Nyquist artifact in a magnetic resonance image, and the matching degree exceeds a preset threshold, a third control signal is generated to control the medical imaging system to start a calibration mode.

10. A medical imaging system, comprising:
    an identification module, configured to identify, based on a trained learning network, an image quality type of a medical image generated by the medical imaging system;
    a control module, configured to generate, based on the identified image quality type, a corresponding control signal for controlling the medical imaging system;
    wherein the image quality type comprises one or a plurality of artifact types; and
    wherein the control module comprises a first control unit configured to generate a first control signal based on an acceleration artifact type in a magnetic resonance image outputted by the identification module, so as to control the medical imaging system to send a warning signal for adjusting an acceleration factor.

11. The system according to claim 10, further comprising:
    a training module, configured to train the learning network based on a data set of sample images and corresponding image quality types thereof.

12. The system according to claim 10, wherein the image quality type comprises one or a plurality of non-artifact types.

13. The system according to claim 10, wherein the identification module outputs an artifact in the medical image and a matching degree of the artifact with the one or plurality of artifact types.

14. The system according to claim 10, wherein the control module comprises a second control unit configured to generate a second control signal based on a motion artifact in a magnetic resonance image outputted by the identification module, so as to control the medical imaging system to send a warning signal about motion of a detected object.

15. The system according to claim 10, wherein the control module comprises a third control unit configured to generate a third control signal based on a Nyquist artifact in a magnetic resonance image outputted by the identification module, so as to control the medical imaging system to start a calibration mode.

16. The system according to claim 15, wherein the control module further comprises a matching degree comparison unit connected to the third control unit and configured to compare the matching degree outputted by the identification module with a preset threshold, and the third control unit generates the third control signal based on the Nyquist artifact outputted by the identification module and a result of the comparison.

17. The medical imaging method, comprising:
- identifying an image quality type of a medical image based on a trained learning network;
- generating, based on the identified image quality type, a corresponding control signal for controlling a medical imaging system;
- wherein the image quality type comprises one or a plurality of artifact types; and
- wherein the medical image is identified as a Nyquist artifact in a magnetic resonance image, a second control signal is generated to control the medical imaging system to start a calibration mode.

* * * * *